United States Patent [19]
Boesch

[11] Patent Number: 5,847,645
[45] Date of Patent: Dec. 8, 1998

[54] TIRE DIAGNOSTIC SYSTEM

[75] Inventor: Mathew Alan Boesch, Plymouth, Mich.

[73] Assignee: Ford Global Technologies, Inc., Dearborn, Mich.

[21] Appl. No.: 869,294

[22] Filed: Jun. 4, 1997

[51] Int. Cl.$^6$ .................................................. B60C 23/00
[52] U.S. Cl. ...................... 340/442; 340/444; 73/146.5; 364/551.01
[58] Field of Search ..................... 340/442, 444, 340/670, 671, 672; 73/146.5, 146.4; 364/551.01, 565, 566

[56] References Cited

U.S. PATENT DOCUMENTS

| | | | |
|---|---|---|---|
| 3,526,873 | 9/1970 | Burt | 340/442 |
| 3,613,075 | 10/1971 | Griffiths | 340/441 |
| 3,691,524 | 9/1972 | Frost et al. | 340/444 |
| 4,149,140 | 4/1979 | Evans et al. | 73/146.2 |
| 4,458,535 | 7/1984 | Juergens | 73/146.2 |
| 4,567,460 | 1/1986 | Gebler | 73/146.2 |
| 4,574,267 | 3/1986 | Jones | 340/444 |
| 4,777,611 | 10/1988 | Tashiro et al. | 340/443 |
| 4,876,528 | 10/1989 | Walker et al. | 340/442 |
| 5,192,929 | 3/1993 | Walker et al. | 73/146.2 |
| 5,218,862 | 6/1993 | Hurrell, II et al. | 340/441 |
| 5,239,469 | 8/1993 | Walker et al. | 73/146.2 |
| 5,252,946 | 10/1993 | Walker et al. | 340/444 |
| 5,343,741 | 9/1994 | Nishihara et al. | 73/146.2 |
| 5,345,217 | 9/1994 | Prottey | 340/441 |
| 5,442,331 | 8/1995 | Kishimoto et al. | 340/441 |
| 5,497,657 | 3/1996 | Taguchi et al. | 73/146.2 |
| 5,513,523 | 5/1996 | Sekiya et al. | 73/146.2 |
| 5,541,573 | 7/1996 | Jones | 73/146.2 |
| 5,569,848 | 10/1996 | Sharp | 340/444 |

OTHER PUBLICATIONS

*Automotive Engineering*/Apr. 1996 1997 Pontiac Grand Prix Sedan 1995.

1995 *Japan Market Mitsubishi Diamante* (Service Manual)– "Low Tire Pressure Warning".

*Primary Examiner*—Jeffery A. Hofsass
*Assistant Examiner*—Daryl C. Pope
*Attorney, Agent, or Firm*—Neil P. Ferraro

[57] ABSTRACT

A tire diagnostic system for detecting an inflation condition of a pneumatic tire on an automotive vehicle includes a sensor cooperating with each wheel to sense a distance related parameter of each wheel and a global positioning receiver for receiving position signals from a global positioning system. A distance related parameter of the vehicle based on the position signals received from the global positioning receiver is calculated so that a desired distance related parameter of a wheel having a predetermined inflated pneumatic tire may be calculated. The system then compares each sensed distance related parameter of each wheel with the desired distance related parameter to determine whether each tire is properly inflated.

17 Claims, 5 Drawing Sheets

TIRE DIAGNOSTIC SYSTEM

FIELD OF THE INVENTION

The present invention relates generally to tire pressure diagnostic systems for automotive vehicles and more particularly to diagnostic systems for detecting an improperly inflated tire using information from global positioning systems.

BACKGROUND OF THE INVENTION

Several low tire detection systems have been described in the literature, including those that monitor tire pressure and profile height. More recently, systems have been described which utilize effective rolling radius calculations to determine when the radius of one of the wheels varies. The generally employed principle of using the effective rolling radius relies on the fact that a wheel with a flat or low pressure tire has an incrementally smaller effective rolling radius than a nominally inflated tire. Often, wheel displacement sensors are used to measure the angular displacement of each wheel. Each of these measurements is related to the effective rolling radius. In this context, the effective rolling radius is defined as the ratio of the true vehicle speed of the center of the wheel divided by the No angular velocity or the true forward distance traveled by the center of a wheel divided by the angular displacement measured over this distance.

A problem with relying on the effective rolling radius of a radial construction tire is that its radius is only weakly dependent on tire pressure. The large "hoop tension" in the tire belt keeps the tire rolling radius almost constant with respect to tire inflation. For example, tests indicate that a tire inflated to only 5 psi will have a rolling radius approximately 0.9% smaller than if it were inflated to its nominal pressure, 30 psi. However, very accurate measurement of rolling radius has become economically feasible due to the enhanced dynamic range of modern 16-bit microprocessors commonly used in Anti-lock Braking Systems (ABS) and which read the wheel revolution sensors.

Another challenge in detecting low tire pressure is that some tire characteristics have a larger influence upon wheel effective rolling radius than inflation pressure. Tire-to-tire manufacturing tolerances typically vary the effective rolling radius by up to 1.2%. Also, during the tire break-in period, approximately the first 100 miles, the effective rolling radius typically can change up to 0.6%. Tread wear also significantly changes the effective rolling radius over the tire's lifetime, typically up to 3.6%.

Certain vehicle operating conditions, such as those conditions which cause wheel slippage and those conditions related to speed, may also cause significant changes to the effective rolling radius.

Generally speaking, any maneuver which causes even slight to moderate wheel slippage will cause the effective rolling radius to change by an amount greater than that caused by pressure variation alone. Such maneuvers include accelerating, decelerating using brakes, steering through sharp turns, and any combinations thereof.

Vehicle operation at very high speeds, (e.g. 100 mph or above), will cause high centrifugal forces in the wheels which can cause the perimeters of the tires to expand in such a way that a low tire will assume the same or larger effective rolling radius as a nominally inflated tire.

Vehicle operation at very low speeds (e.g. less than 6 mph or 10 kph) also poses several problems for effective rolling radius based systems. This is because low speed operation is not a sustained operating point, but a transitional one during which the car is decelerating to a stop, accelerating to normal driving speeds, or steering through sharp turns. Also at low speeds, the wheel rotation sensors' signals drop to a very low amplitude level and become noisy or non-existent. This loss of signal at low speed is a characteristic of current level wheel rotation sensor technology.

A previously filed U.S. patent application (Ser. No. 08/772,642) by the present inventor, which is incorporated herein by reference, discloses a low tire warning system using wheel speed sensors. This system estimates the vehicle's speed or displacement based on a calculated average of all wheel speeds or displacements, respectively. This previous invention relies on the fact that it is probable that not all tires are in a low inflation condition, and therefore at least some of the tires can be used to estimate the vehicle's speed or displacement. If all tires are equally low, however, no low tire condition may be detected. In addition, the particular tire having the low pressure condition may not be accurately determined.

SUMMARY OF THE INVENTION

An object of the present invention is to determine a low tire pressure condition using actual vehicle speed or displacement as indicated by an external source such as a GPS receiver. This object is achieved, and disadvantages of prior art approaches are overcome, by providing a novel tire diagnostic system for detecting an inflation condition of a pneumatic tire on an automotive vehicle. The vehicle includes a plurality of wheels, with each containing a pneumatic tire. In one particular aspect of the invention, the system includes a sensor cooperating with each wheel to sense a distance related parameter of each wheel and a global positioning receiver for receiving position signals from a global positioning system. A distance related parameter of the vehicle based on the position signals received from the global positioning receiver is calculated so that a desired distance related parameter of a wheel having a pneumatic tire with a predetermined inflation may be calculated. The system then compares each sensed distance related parameter of each wheel with the desired distance related parameter to determine whether each tire is properly inflated. As used herein, velocity, displacement, acceleration or any combination thereof may be referred to as "a distance related parameter".

The system may also include an indicator for indicating whether an improperly inflated tire has been detected. In a preferred embodiment, the indicator is activated only when it has been determined that the occurrences of an improperly inflated tire exceeds a predetermined threshold number of occurrences. Also, in a preferred embodiment, the system may include an adjusting means for adjusting the desired distance related parameter after an improperly inflated tire has been serviced. Thus, the calculation of the desired distance related parameter is adjusted based on what the driver deems to be an appropriately inflated tire.

An advantage of the present invention is that low tire pressure may be accurately detected.

Another, more specific, advantage of the present invention is that a low tire pressure condition may be detected independent of the condition of the remaining tires.

Another, more specific, advantage of the present invention is that the particular tire having the low pressure may be determined.

Still another advantage of the present invention is that the response time necessary to determine whether a low tire pressure condition exists is reduced.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
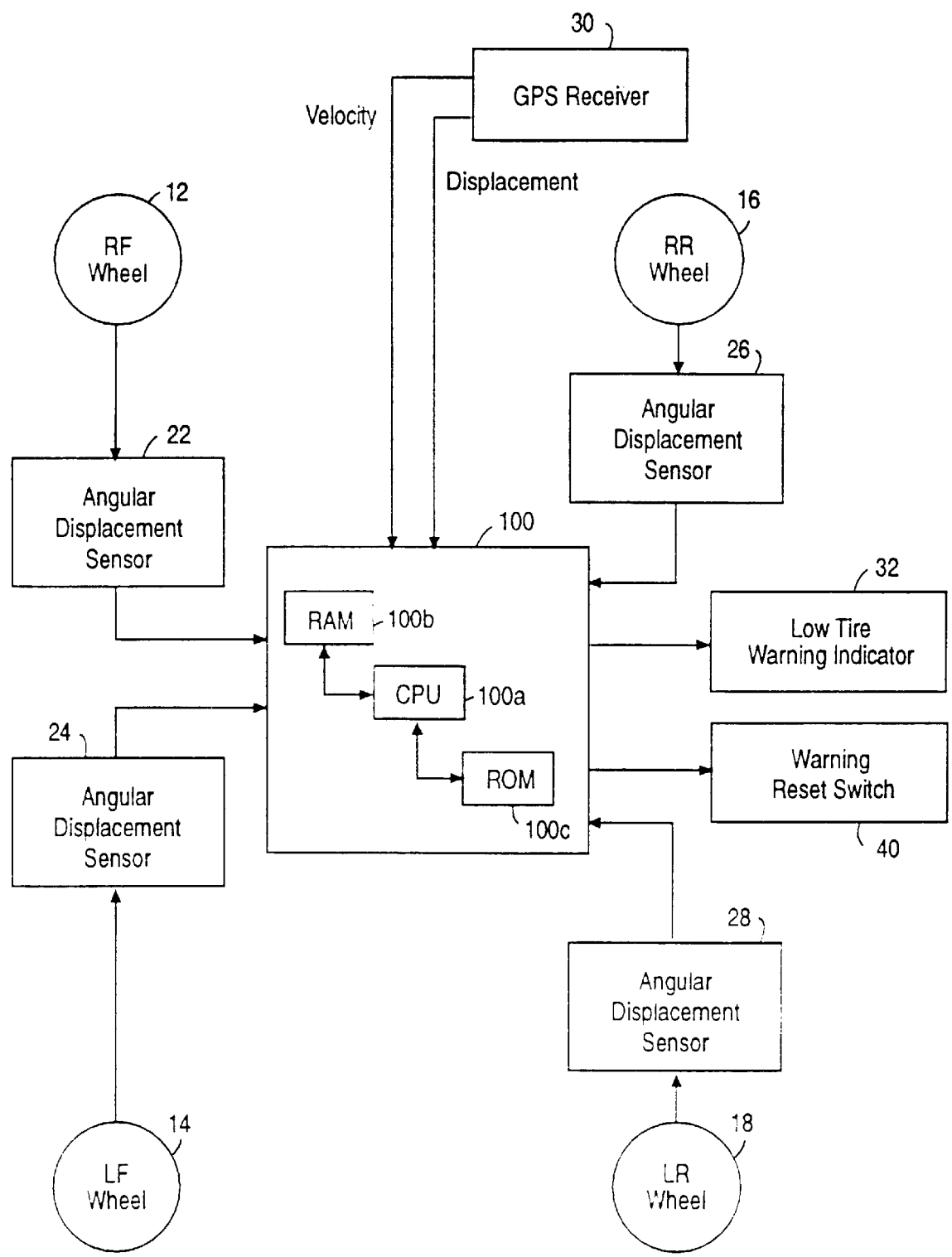
FIG. 1 is a schematic diagram of a tire diagnostic system according to the present invention.

Tire diagnostic system 10, shown in FIG. 1, receives wheel rotation displacement data from right front wheel 12, left front wheel 14, right rear wheel 16 and left rear wheel 18 through corresponding angular displacement sensors 22, 24, 26 and 28. Those skilled in the art will recognize in view of this disclosure that no each sensor, which may be found on vehicles having anti-lock brakes, includes a toothed sensor wheel that rotates with the wheel past a stationary sensor. Each angular displacement sensor outputs a variable frequency signal which is directly related to the rotational speed of the wheel and the number of teeth (typically 50) on the sensor. The rotation signals are then input to tire diagnostic processor 100, which may comprise a conventional engine control microprocessor known to those skilled in the art, or a stand-alone processor, as desired. Processor 100 includes CPU 100a, random access memory (RAM) 100b, computer storage medium (ROM) 100c having a computer readable code encoded therein, which is an electronically programmable chip in this example, and an input/output (I/O) bus (not shown). The computer program encoded in computer storage medium 100c causes processor 100 to detect the condition of a tire, as will be further explained hereinafter.

System 10 also includes global positioning receiver (GPS) 30, which is used to pinpoint the vehicle's position at a given time. Processor 100 repetitively executes an algorithm that evaluates the wheel rotation signals and data from GPS receiver 30, and provides a signal to activate a warning indicator 32 to alert the driver when an improperly inflated tire is detected. A warning reset switch 40 may also be provided to deactivate warning indicator 32 after service is made to correct the improper tire condition.

Figure 2:
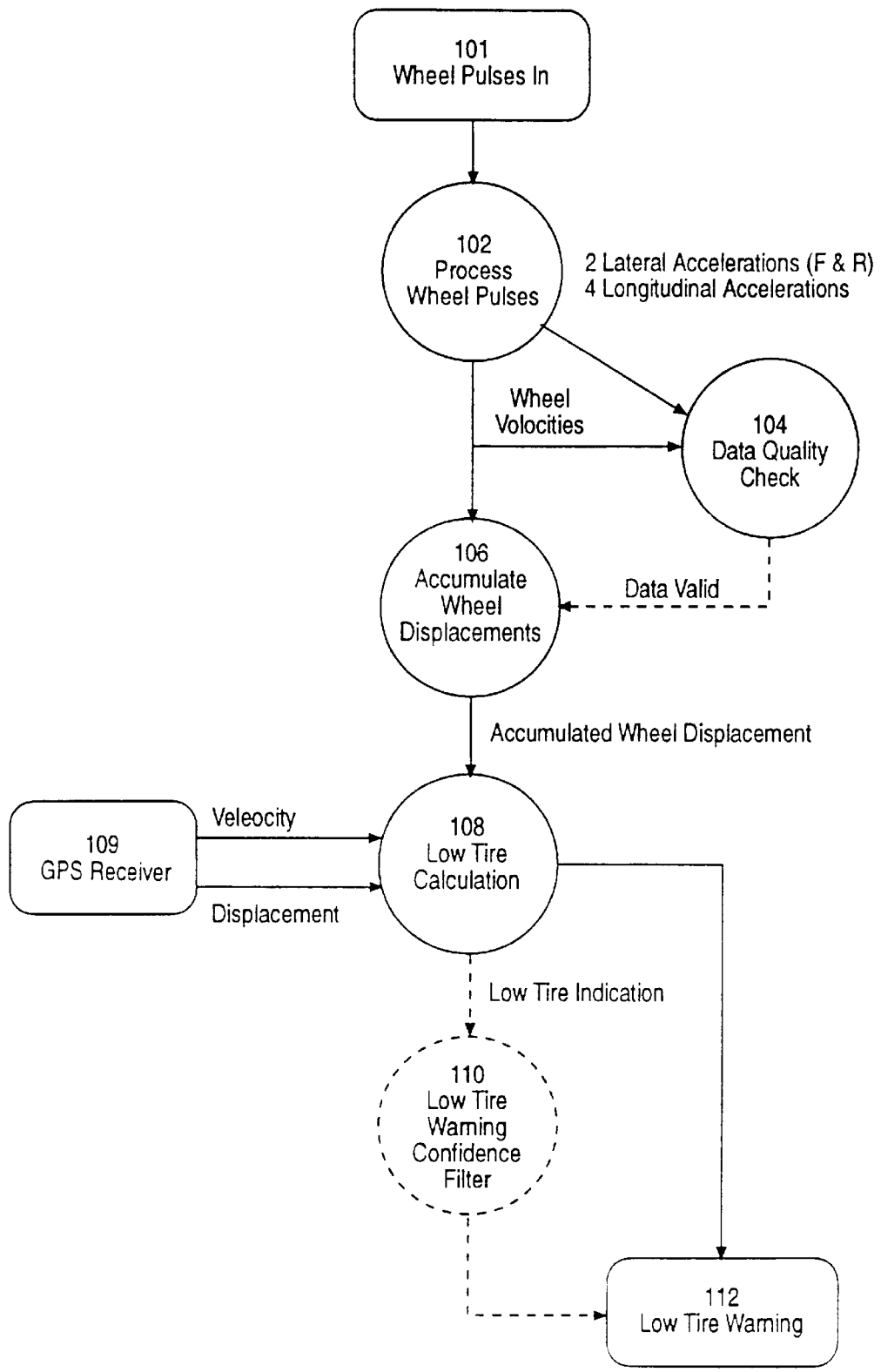
FIG. 2 is a flow chart representing essential data flow of the tire diagnostic system according to the present invention.

Referring now to FIG. 2, a description of the function of the algorithm which is executed within tire diagnostic processor 100 of FIG. 1 and essential data flow of the algorithm is shown. Wheel speed pulses from angular displacement sensors 12, 14, 16 and 18 are input at step 101. At step 102, the wheel speed pulses are processed. The zero crossings of these pulses are monitored over a relatively short sampling period to derive sampling velocity or displacement values for each wheel. Velocity values are then filtered over a relatively longer predetermined sampling period to provide estimates of individual wheel velocities. The estimated wheel velocities are further filtered to provide estimates of individual longitudinal wheel accelerations, as well as lateral accelerations for the front pair of wheels and for the rear pair of wheels.

At step 104, the velocity values and acceleration values are compared to predetermined levels to determine if they are acceptable for further processing. Processor 100 determines at step 104 whether the operating conditions of the vehicle are suitable for the system to accept the velocity and acceleration values. If accepted, a "data valid" signal enables step 106. When enabled, processor 100, at step 106, accepts wheel velocity values for each wheel, determines displacement values and accumulates wheel displacement values until a predetermined distance is determined to have been traveled. After collecting valid wheel velocity data over the required distance, the wheel displacement values are each passed to step 108, and the accumulators used in step 106 are zeroed (not shown). At step 109, processor 100 receives actual vehicle travel distance or velocity over the previously stated sampling period from GPS receiver 30.

Processor 100 calculates the vehicle's displacement along its path of travel or the vehicle's velocity based on data received from GPS receiver 30 during the above mentioned sampling period. Given this information, processor 100 may determine a corresponding wheel angular speed or displacement based on a nominally inflated tire. Assuming, for the sake of clarity, that displacement is used and a low tire pressure condition is sought, processor 100 compares the angular displacement of the wheels as calculated from GPS data to each angular displacement sensed by the angular displacement sensors. If the angular displacement calculated from GPS data is less than the angular displacement sensed by the angular displacement sensor, a low tire pressure condition exists for that tire.

Because the wheel angular displacement is calculated using external data (from GPS 30), a more accurate indication of a tire condition may be provided. That is, in systems using only wheel speed sensors, the actual travel distance is measured using an average of wheel speeds from the sensors. Thus, if, for example, all tires are equally low and the wheel speed of one wheel is compared to the average of all wheel speeds, no low pressure condition can be detected.

In a preferred embodiment, at step 110, processor 100 may proceed from steps 101 to 109 a predetermined number of times. The occurrence of a low tire indication is then accumulated until there is a sufficient number of such occurrences to provide confidence that a low tire condition has been consistently detected and a warning should be given at step 112. This may effectively reduce the effects of turning, wheel slippage, vehicle acceleration, and vehicle deceleration.

Alternatively, processor 100 may proceed directly to step 112, where a warning indicator notifies the driver to check the tires. After checking the tires, the tire condition which caused the warning (such as low pressure) should be corrected. When corrected, the driver or the service technician may reset the system. Thus, the effective radius of a nominally inflated tire, which reflects the value when tire pressures are deemed acceptable to the driver, is updated.

Figure 3A:
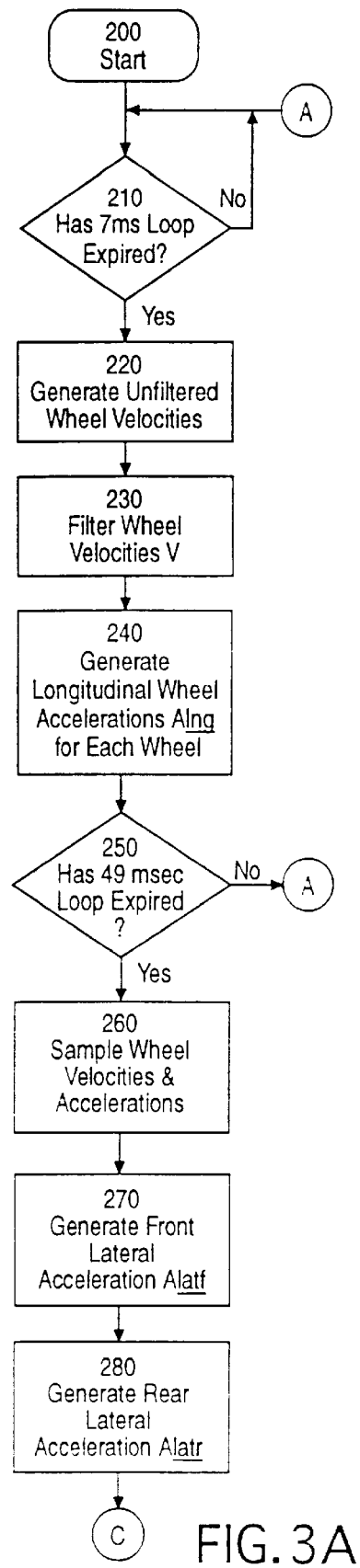
FIGS. 3A–3C are detailed flow diagrams for the preferred embodiments of the present invention; and, FIG. 4 is a detailed flow diagram of a low tire confidence determination step shown in FIG. 3B.
Figure 3B:
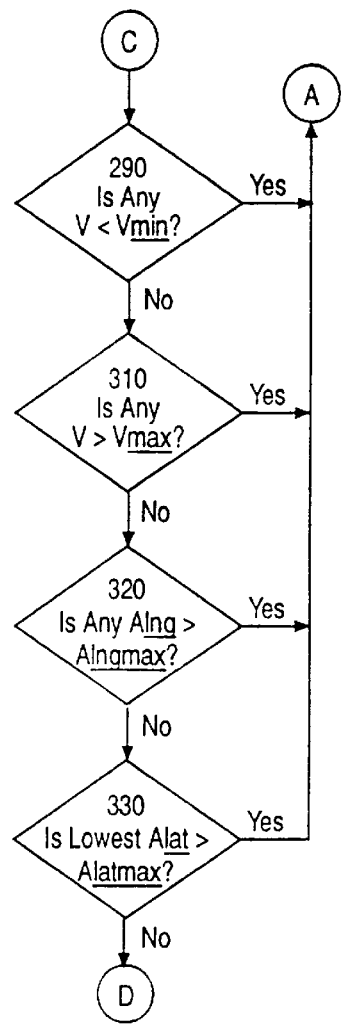

FIGS. 3A and 3B are flowcharts which represents a more detailed description of the process which is executed within tire diagnostic processor 100 of FIG. 1, and which is summarized in the above description of FIG. 2. Although not shown, it should be noted that a conventional counter/timer processing unit can be used to process the individual wheel rotation signals from the angular rotation sensors 22, 24, 26 and 28 shown in FIG. 1 and gathered over a relatively short time period. In this example, a relatively short time period of 7 msec was selected. Such a processing unit should generate an accumulated zero-crossings signal for each wheel, and an elapsed time signal. This information is in turn gathered by the process of FIG. 3A approximately every 7 msec.

Following the start 200, a relatively short time period of 7 msec is established at step 210 where rotational zero-crossing accumulations are sampled. Unfiltered wheel velocity values are generated at step 220, which may be performed in any conventional manner.

The four unfiltered wheel velocity values are then processed at step 230 every 7 msec using a digital low pass filtering and scaling technique according to the relationship:

$$Vk = \alpha(Vk-1) + (1-\alpha)(\mu k),$$

wherein

Vk becomes the filtered velocity value for the most recent of k samples (in this case 7 samples in any 49 msec sampling period);

$\alpha$ is a constant having a value that is less than 1;

Vk−1 is the filtered velocity value for the sampling immediately preceding the most recent sampling; and $\mu k$ is the sensed angular rotation rate for the most recent 7 msec sampling.

This filtering technique produces a smoothed value for each wheel and is termed as filtered wheel velocity values $V_w$ for each wheel. (i.e., $V_{wfl}$ is the filtered wheel velocity value calculated for the front left wheel; $V_{wfr}$ is for the front right wheel; $V_{wrl}$ is for the rear left wheel; and $V_{wrr}$ is for the rear right wheel.)

In step 240, a high pass filtering technique is used every 7 msec to generate four longitudinal wheel acceleration signals $A_{lng}$ according to the relationship:

$$A_{lng}k = \delta(A_{lng}k-1) + \beta[Vk - Vk-1],$$

wherein $\delta$ is a constant, less than 1;

$\delta$ is a constant;

Vk is the most recently calculated filtered velocity;

Vk−1 is the calculated filtered velocity for the sampling immediately preceding the most recent sampling; and $A_{lng}$ k−1 is the longitudinal acceleration value for the sampling immediately preceding the most recent sampling.

The steps performed at 220, 230 and 240 are repeated until 49 msec has expired as determined in step 250. When this predetermined sampling period has expired, the filtered velocities and longitudinal acceleration values for each wheel are sampled at step 260 as $V_w$ and $A_{lng}$ values for each of the four wheels.

In step 270, a front lateral acceleration value $A_{latf}$ is generated for the front pair of wheels. In step 280, a rear lateral acceleration value $A_{latr}$ is generated for the rear pair of wheels. For each pair of wheels the respective steps 270 and 280 are performed by using a filter technique according to the relationships:

$$A_{latf} = \kappa(V_{wfl} - V_{wfr})(V_{wfl} + V_{wfr})$$

$$A_{latr} = \kappa(V_{wrl} - V_{wrr})(V_{wrl} + V_{wrr}),$$

wherein $\kappa$ is a constant;

$V_{wfl}$, $V_{wfr}$, $V_{wrl}$ and $V_{wrr}$ are as described above.

After the lateral acceleration values have been generated, all the velocity and acceleration values are processed for data quality in steps 290–330 (FIG. 3B) as will now be described.

In step 290, each sampled velocity value $V_{wfl}$, $V_{wfr}$, $V_{wrl}$, and $V_{wrr}$ is compared with a predetermined minimum acceptable velocity value $V_{min}$ to determine if the sampled velocity is at an acceptable level. In this embodiment, $V_{min}$ is selected as approximately 5 mph (8 kph). If any velocity value is below the minimum acceptable velocity value, the data is rejected and further processing with that data is prevented. However, if all four of he sampled velocity values are higher than the minimum acceptable value, they are then compared against a predetermined maximum acceptable velocity value $V_{max}$ in step 310. In this embodiment, $V_{max}$ is selected as approximately 100 mph (161 kph). If any velocity value is greater than the maximum acceptable velocity value, the data is rejected as unreliable because of the factors discussed above and further processing with that data is prevented.

Alternatively, data from GPS receiver 30 may be used to determine whether the vehicle's speed is between $V_{min}$ and $V_{max}$.

In step 320, all four of the longitudinal acceleration values $A_{lng}$ are compared with a predetermined maximum acceptable longitudinal acceleration value $A_{lngmax}$. If any of the longitudinal acceleration values $A_{lng}$ are greater than the predetermined maximum acceptable longitudinal acceleration value $A_{lngmax}$, further processing of that data is prevented. This allows further processing only if there is no excessive longitudinal acceleration detected in any wheel, which may be due to braking, slipping or rapid application of wheel torque, as discussed above.

If the longitudinal acceleration data is acceptable, the smallest lateral acceleration value $A_{lat}$ of those generated in step 270 and 280 is compared with a predetermined maximum acceptable lateral acceleration value $A_{latmax}$. The smaller value of $A_{lat}$ is selected for comparison because the occurrence of a low pressure tire will result in one of the two values of $A_{lat}$ to be higher than the other one. Therefore, in order to ensure that data indicative of a low tire will be further processed, it is prudent to validate both values of $A_{lat}$.

Alternatively, data from GPS receiver 30 may be used to determine $A_{lng}$ and $A_{lat}$.

Figure 3C:
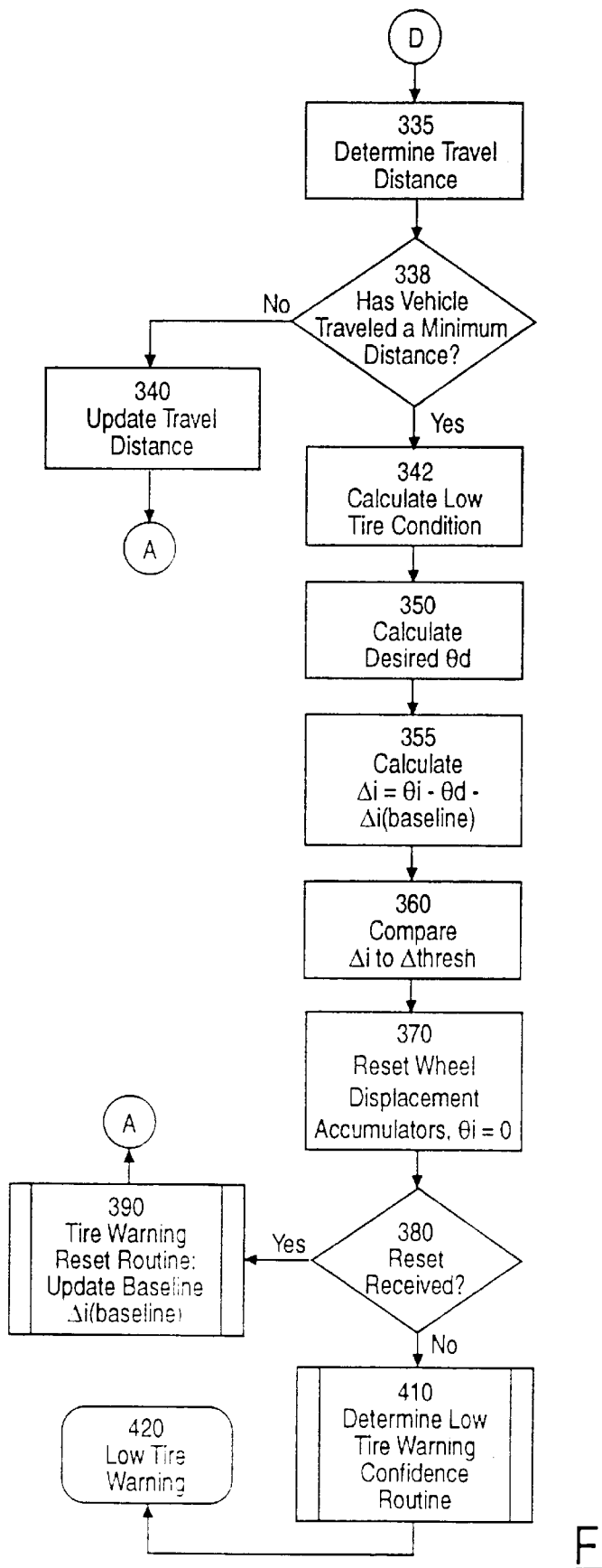

Referring now to FIG. 3C, once the data has been validated, processor 100 proceeds to step 335 where the travel distance is determined. Next, at step 338, processor 100 determines whether the vehicle has traveled a predetermined distance. This is to ensure that the data used to calculate the condition of the tire is valid. If the vehicle has not traveled a predetermined distance, then, at step 340, the travel distance is updated. Travel distance may be conveniently monitored using data from GPS receiver 30.

At step 342, processor 100 enters a routine to determine the tire condition, in this example, whether the tire is low. At step 350, processor 100 uses the travel distance determined from step 335 to calculate a desired wheel displacement $\theta_d$. $\theta_d$ represents the wheel displacement of a nominally inflated tire. That is:

$$\theta_d = X/R_{en},$$

where

X is the distance traveled as indicated by GPS receiver 30; and, $R_{en}$ is the effective rolling radius of a nominally inflated tire.

At step 355, processor 100 compares the actual wheel displacement $\theta_i$ for each wheel (where i represents a particular wheel), as indicated from the wheel speed sensor, to the desired wheel displacement $\theta_d$. In particular, processor 100 calculates the difference between $\theta_i$ and $\theta_d$. This difference is termed $\Delta_i$. At step 360, $\Delta_i$ is compared to a predetermined threshold value, $\Delta_{thresh}$ to determine the condition of the tire. If, for example, $\Delta_i$ is greater than $\Delta_{thresh}$, then a low tire is indicated. According to the present invention, because each tire's displacement $\theta_i$ is compared to the desired displacement $\theta_d$, any particular tire having an improperly inflated tire may be detected.

Those skilled in the art will recognize in view of this disclosure that wheel speed ω may be used to detect the tire condition. In this case:

$$\omega_d = U/R_{en};$$

where

U is the speed of the vehicle; and, $R_{en}$ is the effective rolling radius of a nominally inflated tire.

It should be noted that, at step 355, an additional term is used $\Delta_{i(baseline)}$. This term is a learned value, which will be fully explained with reference to FIG. 4. Suffice it to say for now that $\Delta_{i(baseline)}$ is necessary to adjust the desired $\theta_d$ based on what the driver considers to be an appropriately inflated tire. However, the very first instance that processor 100 determines the condition of the tire, $\Delta_{i(baseline)}$ is zero.

After the tire condition calculation has occurred, the displacement accumulators $\theta_i$ are rest to zero in step 370. In step 380, processor 100 determines whether a reset signal has been received. As discussed above, such a signal would be provided following service to correct a previously detected low tire condition. In addition, the reset signal may be provided as part of a regular maintenance routine in which all the tires are rotated, any tires are replaced, or any inflation is adjusted. If such a reset signal were detected at step 380, a tire warning reset routine 390 would be performed to update the baseline values $\Delta_{i(baseline)}$ for reference in future tire condition calculations.

The tire warning reset routine 390 updates $\Delta_{i(baseline)}$ when the tire pressure conditions are thought to be acceptable to the driver or tire mechanic. Thus, processor 100 learns the desired tire condition and stores these learned parameters in a non-volatile memory, such as a keep alive memory (KAM) or a EEPROM (both not shown). A reset is requested by activating warning reset switch 40 shown in FIG. 1. Although the $\Delta_{i(baseline)}$ will not be updated immediately, processor 100 will immediately inhibit low tire warning indicator 32. $\Delta_{i(baseline)}$ is based upon an average value related to each tire's effective rolling radius and is calculated as the difference between $\theta_i$ and $\theta_d$.

In a preferred embodiment, at step 410, an improperly inflated tire indication from step 360 for each tire i is processed in a confidence routine 410. If the confidence level is determined to be sufficiently high, the tire warning will be activated in step 420.

Figure 4:
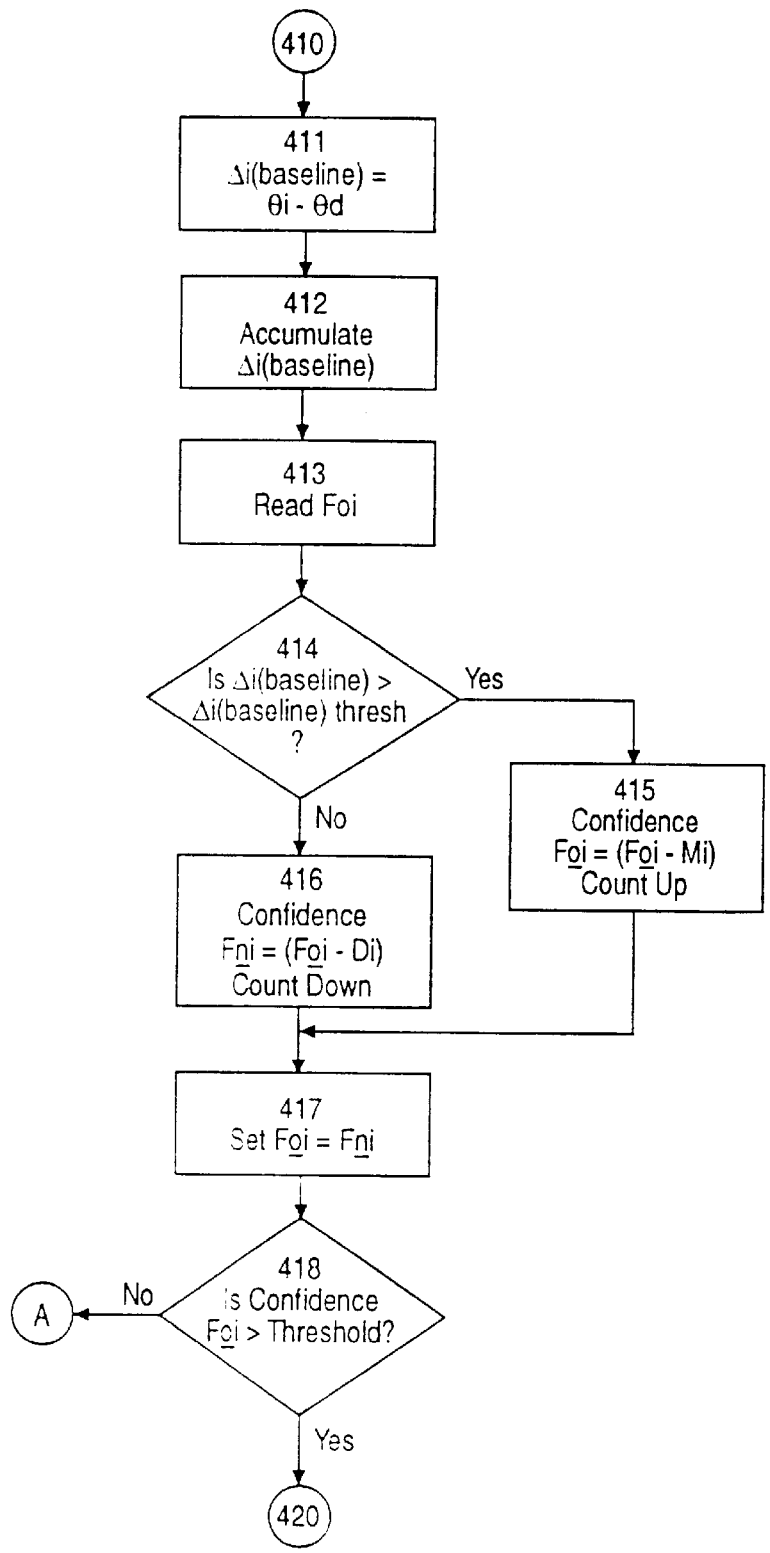

Referring now to FIG. 4, the routine is shown for determining whether the improperly inflated tire indication is sufficient to indicate that an improperly inflated tire condition is detected, and when a sufficient number of such detections occur to provide assurance that an improperly inflated tire condition actually exists.

At steps 411 $\Delta_{i(baseline)}$ is determined as from step 390. An accumulation of sufficiently high values of $\Delta_{i(baseline)}$ is made at step 412 and is represented by a confidence factor $F_{oi}$. At step 413, $F_{oi}$ is read. In step 414, $\Delta_{i(baseline)}$ is compared with a predetermined threshold value $\Delta_{i(baseline)thresh}$. If the comparison in step 414 determines that $\Delta_{i(baseline)}$ exceeds $\Delta_{i(baseline)thresh}$, an updated confidence factor $F_{ni}$ is calculated in step 415 by incrementing the confidence factor $F_{oi}$ read in step 413 by a predetermined increment factor $M_i$. In this case, $M_i$ is and an integer, but may be a constant, or a variable based on conditions selected by one of ordinary skill on the art who implements the invention. After step 415, confidence factor $F_{oi}$ is set equal to updated confidence factor $F_{ni}$ in step 417.

In step 416, the updated confidence factor $F_{ni}$ is determined by decrementing the confidence factor $F_{oi}$ by a predetermined decrement factor $D_i$, when $\Delta_{i(baseline)}$ is determined in step 416 to be below $\Delta_{i(baseline)thresh}$. In this case, $D_i$ is and an integer, but may be a constant, or a variable based on conditions selected by one of ordinary skill on the art who implements the invention. In this embodiment, the use of a decrementing step to offset the incrementing step, means that the building of a confidence factor to a predetermined threshold value may take slightly longer, but the confidence in the determination of an improperly inflated tire will be greater and less likely to give false warnings.

As an alternative to the count down of the confidence factor $F_{ni}$ in step 416, that step can be eliminated in favor of step 415 alone. If the factor $M_i$ is carefully determined, the appropriate confidence level can be reached.

In step 418, the confidence factor $F_{oi}$ from step 417 is compared with a predetermined confidence threshold to determine if the system has sufficient confidence to provide a warning to the vehicle operator that an improperly inflated tire condition exists and that service should be performed to correct the condition.

While the best mode for carrying out the invention has been described in detail, those skilled in the art in which this invention relates will recognize various alternative designs and embodiments, including those mentioned above, in practicing the invention that has been defined by the following claims. For example, the embodiment described herein specifically referred to low tire pressure detection using wheel displacement. However, those skilled in the art will recognize in view of this disclosure that an over inflated tire may also be detected. In addition, wheel speed may be substituted for wheel displacement to detect the improperly inflated tire. Accordingly, as used herein, velocity, displacement, acceleration or any combination thereof may be referred to as "a distance related parameter".

I claim:

1. A tire diagnostic system for detecting an inflation condition of a pneumatic tire on an automotive vehicle, the vehicle having a plurality of wheels, with each wheel containing a pneumatic tire, with said system comprising:

a sensor cooperating with each wheel for sensing a distance related parameter of each wheel over a predetermined time period;

a global positioning receiver for receiving position signals from a global positioning system over said predetermined time period;

a calculator for calculating a distance related parameter of the vehicle based on said position signals received from said global positioning receiver, with said calculator further calculating a desired distance related parameter of a wheel having a pneumatic tire with a predetermined inflation;

a comparator for comparing each said sensed distance related parameter of each wheel with said desired distance related parameter;

an acceleration determinator for determining a longitudinal acceleration value for each wheel;

a preventing means for preventing said sensing of said distance related parameter of each wheel when any said longitudinal acceleration value is outside upper and lower predetermined limits; and, a determinator for determining whether each tire is properly inflated based on said comparison.

2. A system according to claim 1 further comprising an indicator for indicating whether an improperly inflated tire is determined by said determinator.

3. A system according to claim 2 wherein said indicator is activated only when said determinator determines that occurrences of an improperly inflated tire exceeds a predetermined threshold number of occurrences.

4. A system according to claim 3, further comprising:

an accumulator for positively accumulating each occurrence of an improperly inflated tire and negatively accumulating each occurrence of a properly inflated tire; and, wherein said indicator is activated when a sum of said positively and negatively accumulated occurrences exceeds a predetermined threshold number of occurrences.

5. A system according to claim 1 further comprising:

a vehicle speed determinator for determining the speed of the vehicle; and, a preventing means for preventing said sensing of said distance related parameter of each wheel when said vehicle speed is outside upper and lower predetermined limits.

6. A system according to claim 1 wherein the vehicle includes a pair of front wheels and a pair of rear wheels, with said system further comprising:

an acceleration determinator for determining a lateral acceleration value for the front pair of wheels and a lateral acceleration value for the rear pair of wheels; and, a preventing means for preventing said sensing of said distance related parameter of each wheel when any said acceleration value is outside upper and lower predetermined limits.

7. A system according to claim 1 further comprising a preventing means for preventing said sensing of said distance related parameter of each wheel when the distance traveled by the vehicle is less than a predetermined threshold.

8. A system according to claim 1 further comprising an input device for inputting a resetting command to reset said system after an improperly inflated tire has been serviced.

9. A system according to claim 8 further comprising an adjusting means for adjusting said desired distance related parameter after said improperly inflated tire has been serviced, thereby defining a new desired distance related parameter, with said system thereafter determining an improperly inflated tire based on said new desired distance related parameter.

10. A method for detecting an inflation condition of a pneumatic tire on an automotive vehicle, the vehicle having a plurality of wheels, with each wheel containing a pneumatic tire, with said method comprising the steps of:

sensing a distance related parameter of each wheel over a predetermined time period;

receiving position signals from a global positioning system over said predetermined time period;

calculating a distance related parameter of the vehicle based on said position signals received from said global positioning receiver;

calculating a desired distance related parameter of a wheel having a pneumatic tire with a predetermined inflation;

comparing each said sensed distance related parameter of each wheel with said desired distance related parameter;

determining whether each tire is properly inflated based on said comparison;

determining whether occurrences of an improperly inflated tire exceeds a predetermined threshold number of occurrences; and, warning whether an improperly inflated tire is determined by said determining means.

11. A method according to claim 10 further comprising the steps of:

determining the speed of the vehicle; and, preventing sensing of said distance related parameter of each wheel when said vehicle speed is outside upper and lower predetermined limits.

12. A method according to claim 10 further comprising the steps of:

determining a longitudinal acceleration value for each wheel;

determining a lateral acceleration value for each wheel;

preventing said sensing of said distance related parameter of each wheel when any said acceleration value is outside upper and lower predetermined limits.

13. A method according to claim 10 further comprising the step of:

inputting a resetting command to reset said system after an improperly inflated tire has been serviced.

14. A system according to claim 13 further comprising the steps of:

adjusting said desired distance related parameter after said improperly inflated tire has been serviced, thereby defining a new desired distance related parameter; and, thereafter determining an improperly inflated tire based on said new desired distance related parameter.

15. An article of manufacture comprising:

a computer storage medium having a computer program encoded therein for causing a processor to detect an inflation condition of a pneumatic tire on an automotive vehicle, the vehicle having a plurality of wheels, with each wheel containing a pneumatic tire, with said computer storage medium comprising:

a computer readable program code means for causing said computer to sense a distance related parameter of each wheel over a predetermined time period;

a computer readable program code means for causing said computer to receive position signals from a global positioning system over said predetermined time period;

a computer readable program code means for causing said computer to calculate a distance related parameter of the vehicle based on said position signals received from said global positioning receiver;

a computer readable program code means for causing said computer to calculate a desired distance related parameter of a wheel having a pneumatic tire with a predetermined inflation based on said calculated distance related parameter of the vehicle;

a computer readable program code means for causing said computer to compare each said sensed distance related parameter of each wheel with said desired distance related parameter;

a computer readable program code means for causing said computer to determine whether each tire is properly inflated based on said comparison; and, a computer readable program code means for causing said computer to warn whether an improperly inflated tire is determined;

wherein said computer storage medium comprises an electronically programmable chip.

16. An article of manufacture according to claim 15 wherein said computer storage medium further comprises:

a computer readable program code means for causing said computer to determine whether occurrences of an improperly inflated tire exceeds a predetermined threshold number of occurrences.

17. An article of manufacture according to claim 15 wherein said computer storage medium further comprises:

a computer readable program code means for causing said computer to accept a resetting command to reset said system after an improperly inflated tire has been serviced;

a computer readable program code means for causing said computer to adjust said desired distance related parameter after said improperly inflated tire has been serviced, thereby defining a new desired distance related parameter; and, a computer readable program code means for causing said computer to thereafter determine an improperly inflated tire based on said new desired distance related parameter.

\* \* \* \* \*